United States Patent [19]

Kitai et al.

[11] 4,205,909
[45] Jun. 3, 1980

[54] SHUTTER BLADES OPERATING DEVICE FOR CAMERA

[75] Inventors: Kiyoshi Kitai; Tadashi Nakagawa, both of Yotsukaido, Japan

[73] Assignee: Seiki Koki Kabushiki Kaisha, Japan

[21] Appl. No.: 917,198

[22] Filed: Jun. 20, 1978

[30] Foreign Application Priority Data

Jun. 23, 1977 [JP] Japan ............................ 52-82785[U]

[51] Int. Cl.² .............................................. G03B 9/06
[52] U.S. Cl. ................................................... 354/251
[58] Field of Search ................. 354/226, 250, 251, 253

[56] References Cited

U.S. PATENT DOCUMENTS 3,455,228  7/1969  Mutterer ............................... 354/251

FOREIGN PATENT DOCUMENTS 259359   4/1967  Austria ...................................... 354/253
45-28069 9/1970  Japan ........................................ 354/253
1037599  7/1966  United Kingdom ..................... 354/253

Primary Examiner—Monroe H. Hayes
Attorney, Agent, or Firm—Robert E. Burns; Emmanuel J. Lobato; Bruce L. Adams

[57] ABSTRACT

A camera shutter has a set of opening blades and a set of closing blades sequentially driven from cocked positions to released positions to effect an exposure. During cocking of the shutter, the opening and closing blades are driven to their cocked positions by opening and closing mechanisms which include springs for permitting continued movement of the opening and closing mechanisms in the cocking direction after the opening and closing blades are driven to their cocked positions. Upon completion of the movement of the opening and closing blades to their cocked positions, the springs undergo further compression thereby permitting continued cocking movement of the opening and closing mechanisms independent of the opening and closing blades.

6 Claims, 3 Drawing Figures

SHUTTER BLADES OPERATING DEVICE FOR CAMERA

BACKGROUND OF THE INVENTION

This invention relates to a shutter blade operating device for a camera, and more particularly, to a shutter blade operating device of the type wherein exposure motion is performed by two pairs of shutter blades running across a shutter aperture in sequence.

Recently, as reduction in size of portable cameras becomes more popular, the demand for reduced sized shutters is increasing, and particularly, reduction of size of the shutter blade operating device and its control device is being eagerly sought.

In reducing the size of a shutter, it is an important condition to reduce the total dimension of the shutter without changing the diameter of the shutter aperture and without deteriorating the performance of the shutter.

In general, the motion of a shutter blade occurs in three ranges; a first range where the shutter blade starts moving and appears in the aperture, a second range where the shutter blade passes across the aperture and a third range where the shutter blade disappears out of the aperture and finishes its motion. While the shutter blade moves across the second range, a photosensitive film is exposed to light. The first range is a preliminary range provided for stabilizing the movement of the shutter blade. The third range is a final range provided to prevent the shutter blade from rebounding back into the aperture.

Although the second range is essential for the shutter performance and may not change because the size of the aperture is fixed due to functional reasons, the first and the third ranges may be reduced.

In most cameras of today, the film winding and shutter cocking strokes are performed simultaneously in one action and this requires that the stroke of film winding and that of shutter cocking be identical, however, this condition requires a complicated mechanism. In general, such cameras are designed based on priority of the film winding stroke and providing an allowance for the stroke for shutter cocking. Therefore, it is necessary to construct the shutter so as not to be damaged even if the shutter is cocked more than the required stroke.

This condition will not be a problem for the type shutter in which exposure is performed by the reciprocating motion of a pair of blades; however, for a variable-slit shutter in which exposure is performed by the motion of two pairs of shutter blades, there is the possibility that the shutter blades will project out of the confines of their motion.

An object of this invention is to provide a shutter blade operating device of a reduced size which is achieved by narrowing the first and the second ranges while providing means for ensuring that the shutter blades do not project out of the confines of their motion. The essential feature of the shutter blade operating device of this invention is that two pairs of shutter blade sets and shutter blade operating members are interconnected through a pair of springs so that both shutter blade operating members are cocked at the same time during the shutter cocking motion and each shutter blade set is cocked by its corresponding shutter blade operating member through the spring provided between them.

BRIEF DESCRIPTION OF THE DRAWING

Referring to FIG. 1, a base plate (1) has a shutter aperture (1a) and raised projections (1b) and (1c) for limiting the final position of the shutter blades.

Figure 1:
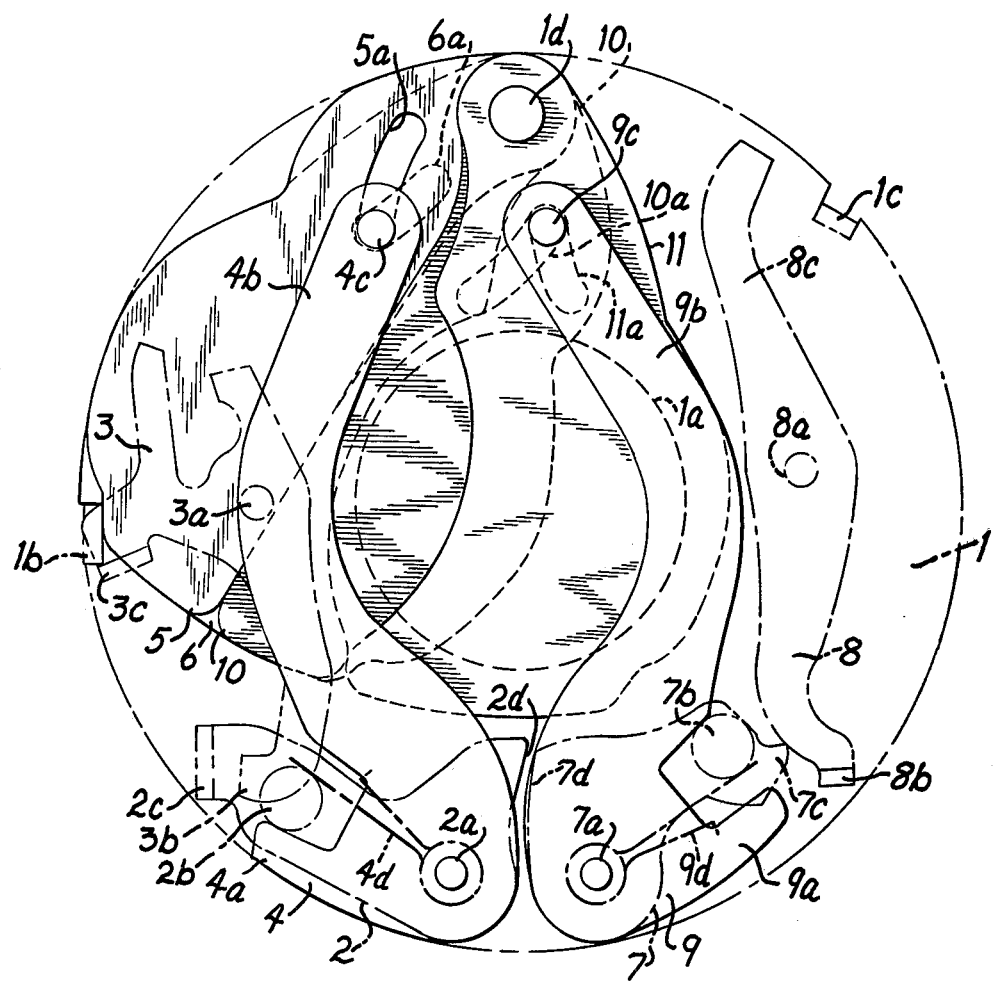
FIG. 1 is a plan view of the shutter blade operating device in the released state.

An opening member (2) having an upwardly projecting pin (2b), a downwardly projecting raised end (2c) and a cam portion (2d) is pivoted on a pivot (2a) and constrained counterclockwise by a spring, not shown.

An opening hook (3) having a hooked end (3b) for retaining the opening member at the cocked position by engaging with the raised end (2c) of the opening member (2) and having a downwardly projecting raised end (3c) is disposed on the back of the base plate (1) and pivoted on a pivot pin (3a) and constrained clockwise by a spring, not shown.

An opening operation lever (4) having an operation arm (4a) engaging with the pin (2b) on the opening member (2), a curved arm (4b) and a downwardly projecting pin (4c) is fitted on the upwardly projecting part of the pivot pin (2a) on the opening member (2) while constrained by a spring (4d) so that the operating arm (4b) is always in contact with the pin (2b).

An opening blade (5) having a configuration to form an opening slit and having a slot (5a) to receive the pin (4c) is pivoted on a pivot pin (1d) fixed on the base plate (1) together with an auxiliary opening blade (6). A slit (6a) on the opening blade (6) receives the pin (4c). These two blades comprise the opening blade set and rest against the raised projection (1b) of the base plate (1).

A closing member (7) having an upwardly projecting pin (7b), a stepped portion (7c) and a cam portion (7d) is pivoted on a pivot pin (7a) on the back of the base plate (1) and constrained counterclockwise by a spring, not shown.

A closing hook (8) having a raised end (8b) for retaining the closing member (7) at the cocked position engaging with the stepped portion (7c) and having an operating arm (8c) is pivoted on a pivot pin (8a) on the back of the base plate (1) and constrained clockwise by a spring, not shown.

A closing operating lever (9) having an operating arm (9a) for engaging with the pin (7b), a curved arm (9b) and a downwardly projecting pin (9c) on one end is fitted on an upwardly projecting part of the pivot pin (7a) on the closing member (7) while constrained by a spring (9d) so that the operating arm (9a) is always biased in a direction away from the pivot pin (7b).

A closing blade (10) having the configuration to form a closing slit and having slot (10a) to receive the pin (9c) is pivoted on the pivot pin (1d) fixed on the base plate (1) together with an auxiliary closing blade (11). A slot (11a) on the closing blade (11) receives the pin (9c). The closing blade (10) and the auxiliary closing blade (11) are fanned out to cover the aperture (1a) in the shutter release state.

In FIG. 1, when the raised end (2c) is turned clockwise about the pivot (2a) against the spring force applied by a spring, not shown, by a cocking means, not shown, and as the shutter cocking operation is performed simultaneously with the film winding the pin (2b) turns the opening operating lever (4) through the spring (4d), then the pin (4c) received in the slot (5a) and (6a) turns the opening blade (5) and the auxiliary opening blade (6) counterclockwise about the pivot pin (1d). When the opening blade (5) is turned so far that it fully overlaps on the closing blade (10), the cam portion (2d) starts turning the closing member (7) clockwise, engaging with the cam portion (7d), about the pivot pin (7a) against the spring force applied by a spring, not shown.

As the closing member (7) turns clockwise, the pin (7b) turns the closing operating lever (9) through the spring (9d), then the pin (9c) fixed on one end of the closing operating lever (9) and received in the slots (10a and 11a) turns the closing blade (10) and the auxiliary closing blade (11) counterclockwise about the pivot pin (1d).

Figure 2:
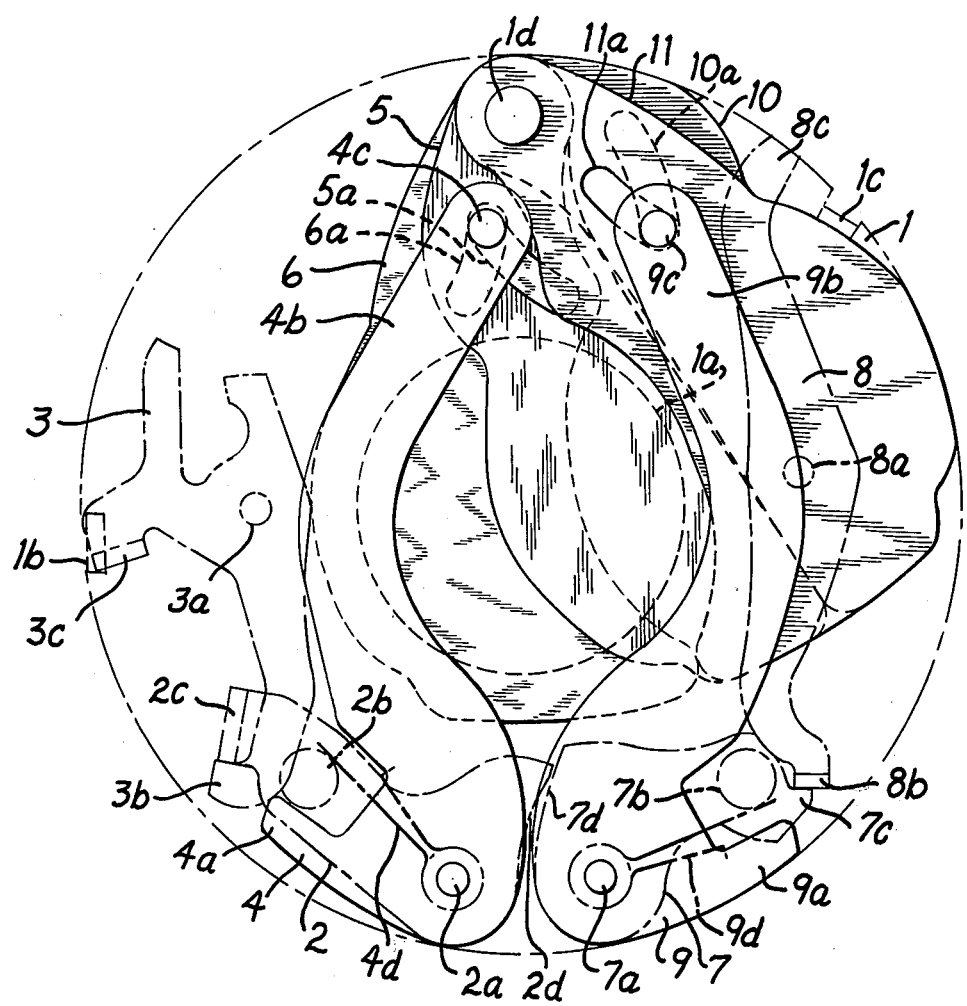
FIG. 2 is a plan view of the shutter blade operating device in the cocked state.

Upon further clockwise rotation of the raised end (2c) about the pivot pin (2a), the blades (5), (6), (10) and (11) are turned counterclockwise about the pivot pin (1d) until the blades (10) and (11) hit against the raised projection (1c) and rest there, while the blades (5) and (6) are turned until the pin (4c) hits against a stopper, not shown, while the opening member (2) and the closing member (7) turn clockwise still further until the raised end (2c) is hooked by the hooked end (3b) of the opening hook (3) and the stepped portion (7c) is hooked by the raised end (8b) of the closing hook (8) so that the shutter is charged as shown in FIG. 2.

In this charged state, every component part is cocked at the charged position, the pin (4c) resting against a stopper, not shown, and the set of closing blades (10) and (11) resting against the raised projection (1c). The two pairs of opening and closing blades are retained at the position shown in FIG. 2 and the opening member (2) and the closing member (7) keep the springs (4d) and (9d) compressed, respectively.

An explanation will now be given of the actuation of the shutter blades during the exposure motion of the shutter.

The shutter is charged as shown in FIG. 2. When the release button is pushed in, an interlocking means turns the opening hook counterclockwise about the pivot pin (3a) so that the hooked end (3b) releases the raised end (2c) of the opening member (2), then the opening member (2) is turned counterclockwise by a spring, not shown, about the pivot pin (2a) so that the pin (2b) pushes the operating arm (4a) of the opening operating lever (4).

The opening operating lever (4) is constrained clockwise by the spring (4d) compressed between the opening operating lever (4) and the pin (2b) and cocked at the position as shown in FIG. 2, therefore, when the pin (2b) pushes against the arm (4a), the opening operating lever (4) is turned counterclockwise as one body with the opening member (2) around the pivot pin (2a) by the spring constraining the opening member (2). The pin (4c) provided on one end of the curved arm (4b) and received in the slots (5a) and (6a) of the opening blade (5) and the auxiliary opening blade (6), respectively, turns the opening blade (5) and the auxiliary opening blade (6) clockwise around the pivot pin (1d) as the opening member (2) turns counterclockwise about the pivot pin (2a) thereby opening the aperture (1a) so that exposure is initiated.

As the opening member (2) turns counterclockwise as far as to the position shown in FIG. 1, the pin (2b) hits against the stopper and the opening blade (5) and the auxiliary opening blade (6) hit against the raised projection (1b).

Some time after the release of the opening member (2), delayed motion of the closing member (7) is initiated controlled by a conventional time-delay device. The closing hook (8) pushed at the operating arm (8c) by a means, not shown, turns counterclockwise about the pivot pin (8a) to release the stepped portion (7c) from the raised end (8b) so that the closing member (7) is released and turned counterclockwise by a spring, not shown, about the pivot pin (7a). When the pin (7b) hits against the closing operating lever (9), the closing member (7) and the closing operating lever (9) are turned counterclockwise as one body about the pivot (7a). The pin (9c) provided on one end of the closing operating lever (9) and received in the slots (10a) and (11a) turns the closing blade (10) and the auxiliary closing blade (11) clockwise about the pivot pin (1d) until the pin (7b) of the closing member (7) hits against the stopper, not shown, so that exposure is completed closing the shutter aperture (1a).

As will be well understood according to the explanation on the construction and the performance of the shutter blade operating device of this invention, the space for the opening and the closing blades functionally necessary to perform exposure is reduced to a minimum as the spring (4d) and (9d) allow additional cocking stroke for the opening member (2) and the closing member (7), respectively, independent of the oening and closing blades after those blades were cocked at the charged position.

At the end of exposing stroke of the opening member (2), instantaneous rebound of the opening member (2) occures when the pin (2b) hits against a stopper, not shown, however, this rebound will not cause the rebound of the opening operation lever (4) and the opening blades (5) and (6) because the arm (4a) parts from the pin (2b) against the spring force provided by the spring (4d) so that the rebound of the opening member (2) is instantaneously absorbed by the spring (4d).

At the end of closing stroke of the closing member (7), instantaneous rebound of he pin (7b) occurs similarly to the case of the pin (2b) when the pin (7b) hit against a stopper, not shown, however, this rebounding is absorbed by the spring (9d) so that the closing blades (10) and (11) will not rebound.

Accordingly, it is possible to reduce the first range by allowing additional strokes of the opening member (2) and the closing member (7) independent of the opening and closing blades at the final stage of shutter cocking procedure as shown in FIG. 2 by providing the springs (4d) and (9d), while it is also possible to reduce the third range as the rebound of the pins (2b) and (7b) is absorbed by the springs (4d) and (9d) and does not affect the blades (5), (6), (10) and (11).

The light shielding of the aperture (1a) is ensured by arranging the opening operating lever (4) and the closing operating lever (9) so as to hang over a part of the aperture (1a) when the aperture (1a) is to be shielded. This arrangement contributes to reducing the size of the shutter.

Figure 3:
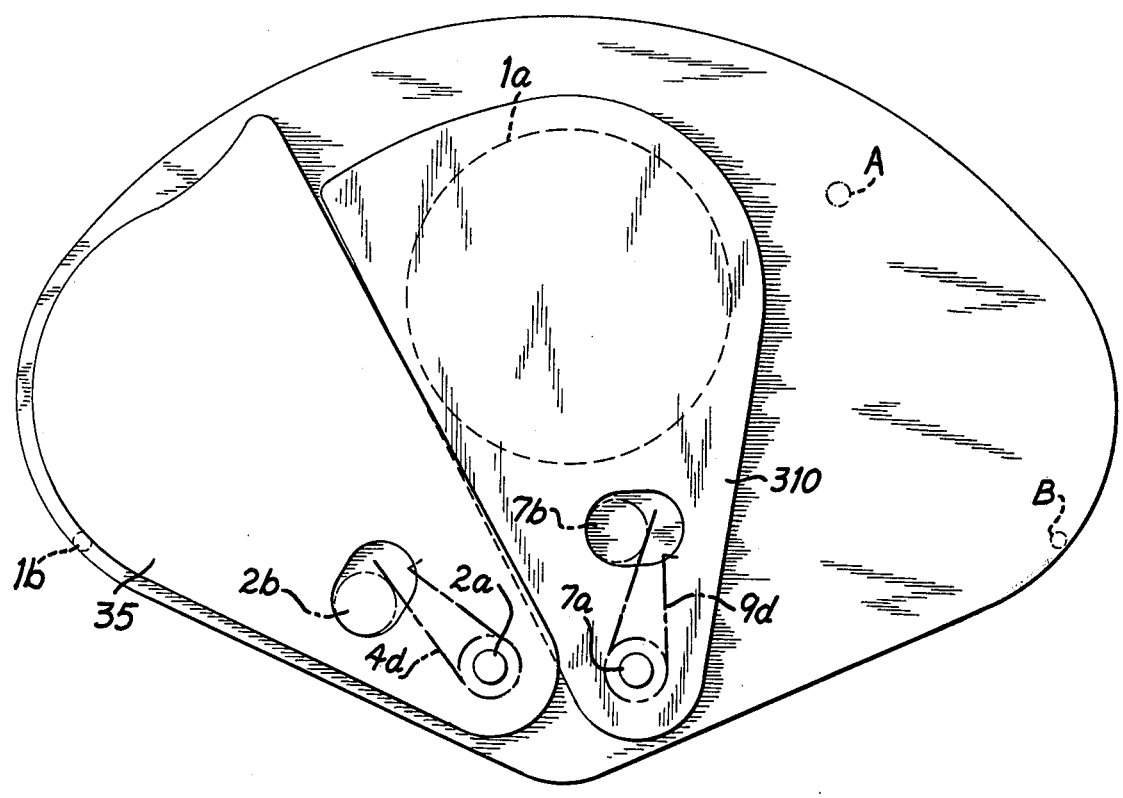
FIG. 3 is a plan view of a modified shutter blade operating device in the released state.

FIG. 3 is a modified shutter blade operating device, according to the present invention, the device being shown in the shutter released state. The parts indicated by the same reference numerals as used in FIGS. 1 and 2 function similarly to the parts heretofore described with reference to FIGS. 1 and 2 and therefore will not be further described in detail.

Referring to FIG. 3, a pin (2b) of an opening member (2) controls a single opening blade (35). A spring (4d) is compressed between the pin (2b) and the blade (35). A pin (7b) of a closing member (7) controls a single closing blade (310). A spring (9d) is compressed between the pin (7b) and the blade (310).

When the opening member (2) is turned clockwise about the pivot pin (2a) to cock the shutter, the pin (2b) turns the opening blade (35) clockwise about the pivot pin (2a) through the spring (4d) until the blade (35) hits against a fixed pin (A). The pin (7b), similarly to the pin (2b), turns the closing blade (310) clockwise about the pivot pin (7a) through the spring (9d) until the blade (310) hits against a fixed pin (B). The springs (4d) and (9d) allow the opening member (2) and the closing member (7), respectively, to turn further, as in the first embodiment, until they are cocked by a opening hook (3) and a closing hook (8), respectively, after the opening and the closing blades are cocked. The performance and the effect of the other parts are similar to those of the first embodiment, therefore, detailed explanation thereof will be omitted.

It may be well understood that according to the present invention, the film winding motion and the shutter cocking motion are easily interlocked by providing springs between the shutter blades and the shutter blade operating members to allow additional movement of the shutter blade operating members independent of the shutter blades. Also according to the present invention, irregular exposure and partial double exposure due to rebound of the shutter blades at the final stage of exposure is prevented by the springs provided between the shutter blades and their operating members, thus, enabling an extremely reduced-sized shutter.

We claim:

1. A shutter blades operating device for a camera comprising: an opening member urged by a spring so as to initiate exposure motion of the shutter; an opening blade actuated by said opening member to open the aperture of the shutter; an opening spring engaged with both said opening member and said opening blade and urging said opening member so as to initiate exposure; a closing member urged by a spring to complete exposure; a closing blade actuated by said closing member to close the aperture of the shutter; and a closing spring engaged with both said closing member and said closing blade and urging said closing member so as to complete exposure.

2. In a camera shutter having a shutter aperture: a set of opening blades movable during cocking of the shutter from a released position in which said set of opening blades uncovers said aperture to a cocked position in which said set of opening blades covers said aperture and movable during exposure-taking from said cocked position to said released position; cockable opening means movable in a cocking direction during cocking of the shutter to effect cocking movement of said set of opening blades to said cocked position and movable in the reverse direction during exposure-taking to effect opening movement of said set of opening blades from said cocked position to said released position to thereby initiate taking of an exposure, said opening means including first spring means for effecting cocking movement of said set of opening blades to said cocked position and thereafter permitting continued movement of said opening means in said cocking direction independent of and without further cocking movement of said set of opening blades; a set of closing blades movable during cocking of the shutter from a released position in which said set of closing blades covers said aperture to a cocked position in which said set of closing blades uncovers said aperture and movable during exposure-taking from said cocked position to said released position; and cockable closing means movable in a cocking direction during cocking of the shutter to effect cocking movement of said set of closing blades to said cocked position and movable in the reverse direction during exposure-taking to effect closing movement of said set of closing blades from said cocked position to said released position to thereby complete taking of the exposure, said closing means including second spring means for effecting cocking movement of said set of closing blades to said cocked position and thereafter permitting continued movement of said closing means in said cocking direction independent of and without further cocking movement of said set of closing blades.

3. In a camera shutter according to claim 2; wherein said set of opening blades comprises a plurality of opening blades; and said set of closing blades comprises a plurality of closing blades.

4. In a camera shutter according to claim 3; wherein said opening means includes a pivotable opening member, a pivotable opening operating lever pivotally connected through pin and slot connections to said set of opening blades, and wherein said first spring means is resiliently compressed between said opening member and opening operating lever so as to transmit initial cocking movement of said opening member to said opening operating lever to thereby drive said set of opening blades to said cocked position and permitting continued cocking movement of said opening member without further cocking movement of said opening operating lever due to further compression of said first spring means upon completion of the movement of said set of opening blades to said cocked position by said opening operating lever; and wherein said closing means includes a pivotable closing member, a pivotable closing operating lever pivotally connected through pin and slot connections to said set of closing blades, and wherein said second spring means is resiliently compressed between said closing member and closing operating lever so as to transmit initial cocking movement of said closing member to said closing operating lever to thereby drive said set of closing blades to said cocked position and permitting continued cocking movement of said closing member without further cocking movement of said closing operating lever due to further compression of said second spring means upon completion of the movement of said set of closing blades to said cocked position by said closing operating lever.

5. In a camera shutter according to claim 2; wherein said set of opening blades comprises one opening blade; and said set of closing blades comprises one closing blade.

6. In a camera shutter according to claim 5; wherein said opening means includes a pivotable opening member pivotally connected through a pin and slot connection to said opening blade, and wherein said first spring means is resiliently compressed between said opening member and opening blade so as to transmit initial cocking movement of said opening member to said opening blade to thereby drive said opening blade to said cocked position and permitting continued cocking movement of said opening member without further cocking movement of said opening blade due to further compression of said first spring means upon completion of the movement of said opening blade to said cocked position; and wherein said closing means includes a pivotable closing member pivotally connected through a pin and slot connection to said closing blade, and wherein said second spring means is resiliently compressed between said closing member and closing blade so as to transmit initial cocking movement of said closing member to said closing blade to thereby drive said closing blade to said cocked position and permitting continued cocking movement of said closing member without further cocking movement of said closing blade due to further compression of said second spring means upon completion of the movement of said closing blade to said cocked position.

* * * * *